United States Patent
Kim

(10) Patent No.: US 6,721,797 B1
(45) Date of Patent: Apr. 13, 2004

(54) PARTIAL BACK PRESSURE (PBP) TRANSMISSION TECHNIQUE FOR ATM-PON USING RATE CONTROLLERS TO REDUCE A MAXIMUM OUTPUT RATE FROM A PEAK RATE TO A CONTROLLED RATE

(75) Inventor: Kyeong-Soo Kim, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/571,929

(22) Filed: May 16, 2000

(51) Int. Cl.[7] .................. G06F 15/16; G06F 15/173
(52) U.S. Cl. .................. 709/232; 709/223; 709/224; 709/225; 709/233
(58) Field of Search .................. 370/230, 392, 370/395, 437, 468; 709/105, 232, 233, 234, 223, 224, 225

(56) References Cited

U.S. PATENT DOCUMENTS

| | | | |
|---|---|---|---|
| 5,453,980 A | * 9/1995 | Van Engelshoven | 370/395.53 |
| 5,648,958 A | * 7/1997 | Counterman | 370/437 |
| 5,719,853 A | 2/1998 | Ikeda | 370/229 |
| 5,838,922 A | 11/1998 | Galand et al. | 395/200.62 |
| 5,860,148 A | 1/1999 | Bergantino et al. | 711/209 |
| 5,926,478 A | * 7/1999 | Ghaibeh et al. | 370/395.51 |
| 5,978,374 A | 11/1999 | Ghaibeh et al. | 370/395 |
| 6,198,558 B1 | * 3/2001 | Graves et al. | 370/395.51 |
| 6,229,788 B1 | * 5/2001 | Graves et al. | 370/230 |
| 6,424,656 B1 | * 7/2002 | Hoebeke | 370/468 |
| 6,498,667 B1 | * 12/2002 | Masucci et al. | 370/230 |
| 6,519,255 B1 | * 2/2003 | Graves | 370/392 |

FOREIGN PATENT DOCUMENTS

EP 0 648 034 A4 4/1995 ........... H04L/12/28

OTHER PUBLICATIONS

Bonomi, F. et al.,: "The Rate-Based Flow Control Framework for the available bit rate ATM Service", IEEE Network, Mar. 1, 1995.

* cited by examiner

Primary Examiner—Rupal Dharia
Assistant Examiner—Quang Nguyen
(74) Attorney, Agent, or Firm—Matthew J. Hodulik

(57) ABSTRACT

Efficient transmission and fairness guarantees for upstream traffic in ATM-PONs are achieved using a partial back pressure (PBP) technique for traffic generated from user network interface (UNI) cards, e.g. Ethernet UNI cards or other network interface cards for non-constant bit rate sources. The PBP technique utilizes a feedback flow control mechanism between priority queues and UNI cards in a customer-side interface device, e.g. an Optical Network Termination unit, to achieve improved transmission efficiency and fairness guarantees of incoming traffic. The peak upstream rate of the UNI cards is dynamically controlled based on feedback information from the interface device where a queue status monitor observes the traffic level in the priority queue. Upon reaching a designated threshold level in the priority queue, the status monitor triggers activation of rate controllers in the upstream output of the UNI cards. The rate controllers reduce the peak output of the UNI cards to a controlled peak rate. Once the queue level is reduced beyond a second threshold level, the status monitor deactivates the rate controllers.

20 Claims, 3 Drawing Sheets

PARTIAL BACK PRESSURE (PBP) TRANSMISSION TECHNIQUE FOR ATM-PON USING RATE CONTROLLERS TO REDUCE A MAXIMUM OUTPUT RATE FROM A PEAK RATE TO A CONTROLLED RATE

FIELD OF THE INVENTION

The present invention relates generally to Asynchronous Transfer Mode (ATM) communication systems and more particularly to ATM communications systems employing Passive Optical Networks (PONs).

BACKGROUND OF THE INVENTION

Asynchronous Transfer Mode-Passive Optical Networks (ATM-PONs) are considered a promising solution for fiber-based access networks communicating to end-users in Fiber-To-The-Home (FTTH)/Fiber-To-The-Building (FTTB) environments. Many ATM-PONs utilize a tree topology where a passive optical splitter/merger provides broadcasting in the downstream direction and merging in the upstream direction. The splitter/merger typically couples to a single Optical Line Termination unit (OLT) in the upstream direction and to multiple Optical Network Termination units (ONTs) in the downstream direction, thus providing the tree topology. The OLT provides the network-side interface of the optical access network, while the ONTs provide the customer-side interface to the optical access network. Because all incoming ATM cells from ONTs are combined into one cell stream en route to the OLT through the optical merger, there may be collisions among upstream (ONT to OLT) cells from different ONTs unless proper preventative mechanisms are employed.

A grant allocation technique is used to control upstream cell transfer from ONTs, where a grant is permission from the OLT for an ONT to send one upstream cell at a specified slot. A current approach considered by many vendors as well as the standards body is per-QoS (quality of service) class traffic control, where one queue is provided per each QoS class at the ONT and a simple scheduler provides prioritized services among queues. One prior art ONT architecture includes two user network interface (LNI) cards with the physical memory at the ONT configured into a number of queues to accommodate the different service classes. One typical priority queue configuration assigns CBR (constant bit rate) traffic to a $1^{st}$ priority queue, real-time VBR (variable bit rate) traffic to a $2^{nd}$ priority queue, non-real-time VBR traffic to a $3^{rd}$ priority queue, ABR (available bit rate) traffic to a $4^{th}$ priority queue and UBR (unspecified bit rate) traffic to a $5^{th}$ priority queue. When receiving normal data grants, the server scans the $1^{st}$ priority queue and sends a cell if any are available. Otherwise, the server scans the next queue and repeats scanning to the $5^{th}$ queue until it finds a cell to send. In this manner, queues with higher priorities are guaranteed to receive service before queues with lower priorities. If only data grants are used with this priority queuing scheme, a so-called starvation effect may occur. For example, if there is any nonconforming, greedy traffic arriving at one of the higher priority queues, then cells in lower priority queues cannot receive a fair amount of services even though conforming to the traffic contract. To prevent this starvation effect and provide a fair amount of services to cells in lower priority queues, tagged grants (which are special data grants) can be used. When a tagged grant is received from the OLT, the server starts scanning queues, for example, not from the $1^{st}$ priority queue but from the $3^{rd}$ priority queue.

One problem with this per-QoS class traffic control in the ONT is the lack of fairness guarantee among UNIs, e.g. Ethernet UNIs, when multiple UNIs are used in the same ONT. Because all incoming traffic with the same QoS class (e.g. ABR & UBR) is stored at the same priority queue and handled without any notion of connection by the scheduler, there may be a case where traffic from some end-users cannot get a guaranteed amount of service when traffic rates from others are exceedingly high. Therefore, some mechanism should be implemented inside the ONT to provide fairness among Ethernet UNIs in the same ONT.

One technique based on the previously described ONT architecture and the use of tagged grants to solve the fairness issue has streams from the two Ethernet UNIs assigned to different priority queues, i.e., one to a high priority queue and the other to a lower priority queue. Two different grants, one for normal data grants and the other for tagged grants, are used to isolate both streams. The OLT can then directly control two Ethernet UNIs in the same ONT with different grants and provide fairness between them.

This two-queue approach has a number of disadvantages. For instance, the two-queue approach typically leads to non-efficient and asymmetrical use of bandwidth. That is, a traffic stream associated with a higher priority queue cannot share the bandwidth assigned to the other stream, i.e., tagged grants, while a stream at a lower priority queue can share the bandwidth to a stream at a higher priority queue, i.e., data grants. Therefore, some portion of the bandwidth is wasted. Even with the same grant rate, the actual amount of transmitted traffic for both streams can be different unless there are always cells in the higher priority queue when data grants are received.

Another drawback is the use of non-standardized tagged grants. This technique cannot be utilized in the case where one vendor's ONTs are used with the OLT from other vendors not supporting tagged grants. Finally, the two-queue approach lends itself to poor scalability. As an example, the two-queue approach can accommodate two Ethernet UNI cards at an ONT, where each Ethernet UNI can have only one stream, i.e., a virtual channel. However, if an ONT supports more than two Ethernet UNI cards or each Ethernet UNI card can support more than one stream, the two-queue approach is no longer applicable.

SUMMARY OF THE INVENTION

Efficient transmission and fairness guarantees for upstream traffic in ATM-PONs are achieved using a partial back pressure (PBP) technique for traffic generated from user network interface (UNI) cards, e.g. Ethernet UNI cards or other network interface cards for non-constant bit rate sources. The PBP technique utilizes a feedback flow control mechanism between priority queues and UNI cards in a customer-side interface device, e.g. an Optical Network Termination unit, to achieve improved transmission efficiency and fairness guarantees of incoming traffic. The peak upstream rate of the UNI cards is dynamically controlled based on feedback information from the interface device where a queue status monitor observes the traffic level in the priority queue. Upon reaching a designated threshold- level in the priority queue, the status monitor triggers activation of rate controllers in the upstream output of the UNI cards. The rate controllers reduce the peak output of the UNI cards to a controlled peak rate. Once the queue level is reduced beyond a second threshold level, the status monitor deactivates the rate controllers.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Figure 1:
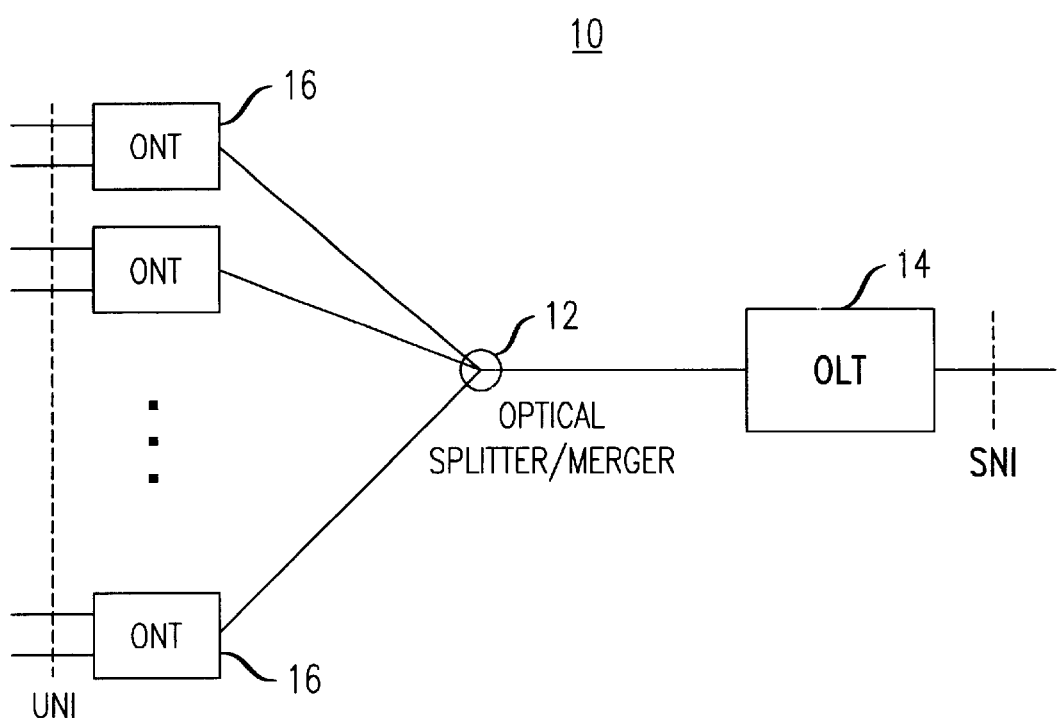
FIG. 1 is an exemplary embodiment of an ATM passive optical network (PON) configured in a tree topology.

Asynchronous Transfer Mode-Passive Optical Networks (ATM-PONs) are being used in fiber-based access networks communicating to end-users in Fiber-To-The-Home (FTTH)/Fiber-To-The-Building (FTTB) environments. FIG. 1 shows an ATM-PON 10 configured in a basic tree topology. A passive optical splitter/merger 12 couples to a single Optical Line Termination unit (OLT) 14 in an upstream direction and to multiple Optical Network Termination units (ONTs) 16 in a downstream direction. The passive optical splitter/merger 12 provides broadcasting in the downstream direction and merging in the upstream direction. In the exemplary ATM-PON shown in FIG. 1 and in accordance with ITU-T Recommendations G.983- 1 and 983-2, part of the Full Services Access Networks (FSAN) initiative, the OLT 14 provides the network side interface of the optical access network, while the ONTs 16 provide the customer side interface to the optical access network.

Figure 2:
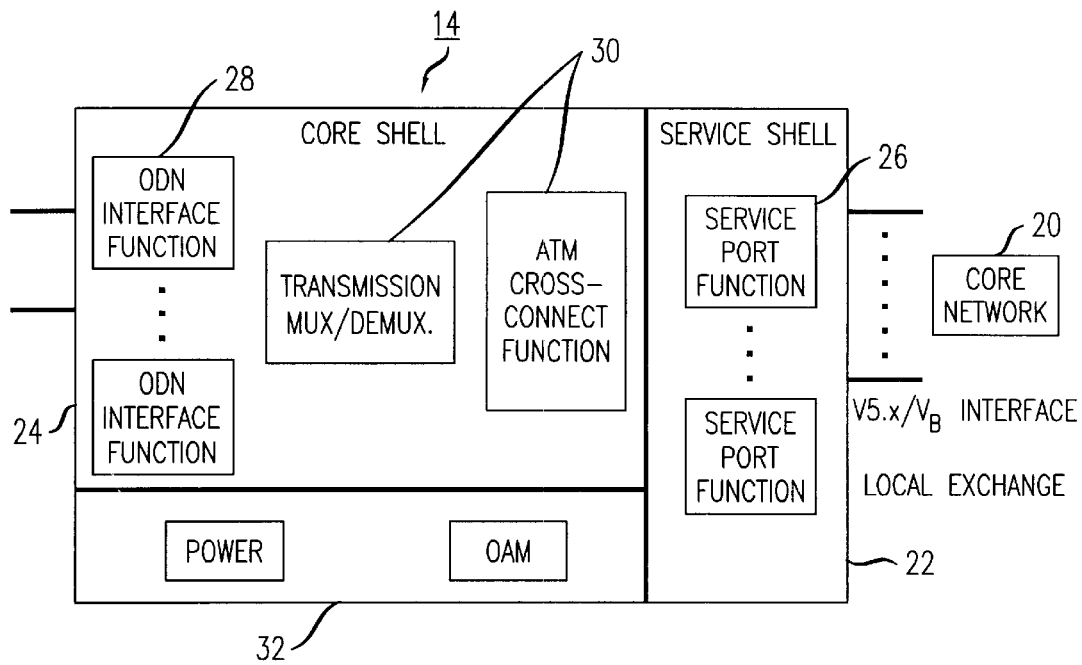
FIG. 2 is an exemplary block diagram of an optical line termination unit (OLT) used in a passive optical network.

Referring to FIG. 2, a functional block diagram of an exemplary OLT 14 is shown. The OLT 14 is typically coupled to a switched network 20 via standardized interfaces 22 (e.g., VB5.x, V5.x, NNI's). At the distribution side 24, the OLT presents optical accesses according to agreed upon requirements, e.g., in terms of bit rate or power budget. The OLT 14 is generally comprised of service ports 26, an optical distribution network (ODN) interface 28, and MUX 30 for VP management, as well as a power and operation administration and maintenance functions 32. As would be understood, the illustrated combination is not intended to preclude the Virtual Channel (VC) layer function in the OLT.

In general, the service ports 26 interface to service nodes in the network. The service ports insert ATM cells into the upstream synchronous digital hierarchy (SDH) payload and extracts ATM cells from the downstream SDH payload. The MUX 30 provides VP connections between the service port 26 and the ODN interface 28 and different VPs are assigned to different services. Various information, such as main contents, signalling, and OAM flows is exchanged by using VCs of the VP. In the ODN interface 28, a PON Line Terminal handles the optoelectronic conversion process. The ODN interface 28 inserts ATM cells into the downstream PON payload and extracts ATM cells from the upstream PON payload.

The OLT 14 in an ATM-PON has full control over upstream traffic in ONTs by issuing grants. A grant allocation technique is used to control upstream cell transfer from ONTs 16 to the OLT 14. Grant allocation is necessary to coordinate transmission of cells from the ONTs because at a given time slot, one ONT has no idea about whether other ONTs will or will not transmit cells. As is understood, a grant is permission for an ONT to send one upstream cell at a specified slot. The grant is conveyed in downstream Physical Layer Operation & Maintenance (PLOAM) cells. The current ITU recommendations specify one data grant per ONT at a time. With only one data grant per ONT, the OLT controls upstream traffic not on a per-connection basis but on a per-ONT basis. Ideally, an ONT would handle each connection made thereto on its own which would entail the implementation of a per-connection queuing and scheduling scheme at the ONT. However, a primary concern in ATM-PON is the overall economy of the system. In this regard, ONTs are the main target for economy because of the large number of them to be deployed, where a complicated queuing and scheduling scheme for ONTs would not make practical sense.

Figure 3:
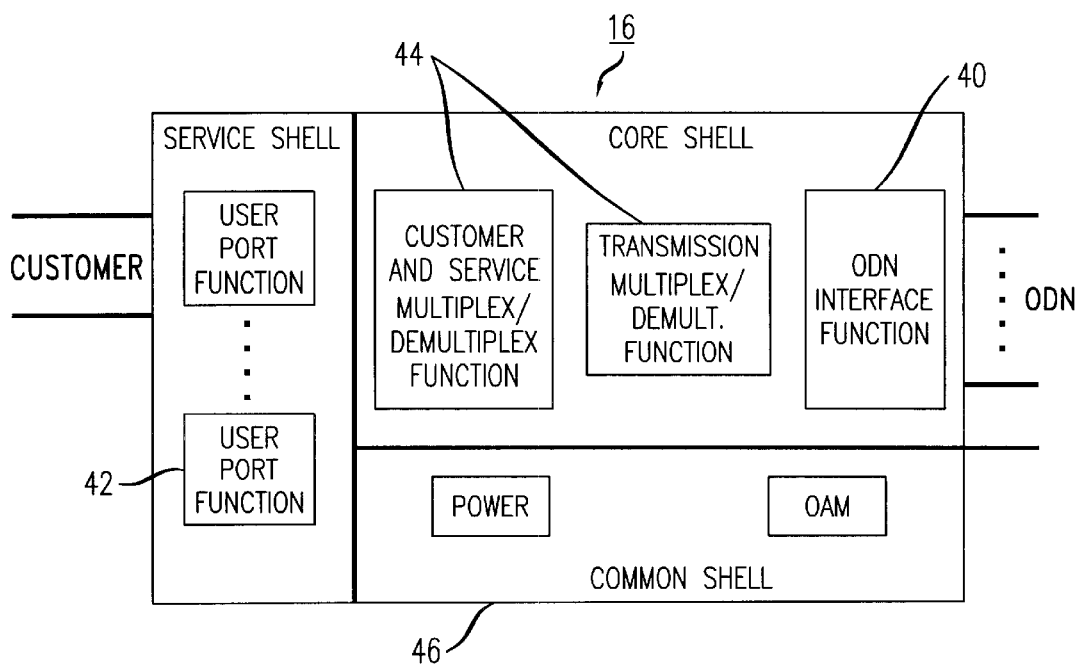
FIG. 3 is an exemplary block diagram of an optical network termination unit (ONT) used in a passive optical network.

FIG. 3 illustrates an exemplary functional block diagram of an ONT 16. The ONT 16 is an active device that couples the in-house network distribution facilities to the access network. The ONT 16 generally comprises an optical distribution network (ODN) interface 40, a User Port 42, a Transmission, Services and Customer Multiplexing (MUX)/demultiplexing function 44 and power and operation, administration and maintenance functions 46. The ODN interface 40 handles the optoelectronic conversion process, where the ODN interface extracts ATM cells from the downstream PON payload and inserts ATM cells into the upstream PON payload based on synchronization acquired from the downstream frame timing. As shown, the multiplexer (MUX) 44 couples to and multiplexes service interfaces to the ODN interface 40. Since only valid ATM cells can be passed through the MUX 44, many VPs can share the assigned upstream bandwidth effectively. The User Port 42 interfaces over UNIs to one or more end-user device as would be understood, for example, a computer terminal, a hub/bridge for a LAN and/or a television for video broadcasting. The User Port 42 inserts ATM cells into the upstream payload and extracts ATM cells from the downstream payload.

As discussed in the background, one significant problem with per-QoS class traffic control in the ONTs 16 of many vendors is the lack of fairness guarantee among Ethernet UNI cards in the same ONT when multiple UNIs are used. Because all incoming traffic with the same QoS class (e.g. ABR and UBR) is stored at the same priority queue and handled without any notion of connection by the scheduler, there may be a case where traffic from some end-users cannot get a guaranteed amount of service when traffic rates from others are exceedingly high.

One technique based on the use of tagged grants to solve the above fairness issue has streams from two Ethernet UNIs assigned to different priority queues, i.e., one to a high priority queue and the other to a lower priority queue, and two different grants, one for normal data grants and the other for tagged grants, are used to isolate both streams. The OLT can then directly control two Ethernet UNIs in the same ONT with different grants and provide fairness between them. The two-queue approach has a number of disadvantages which are solved by the partial back pressure allocation technique of the present invention.

Figure 4:
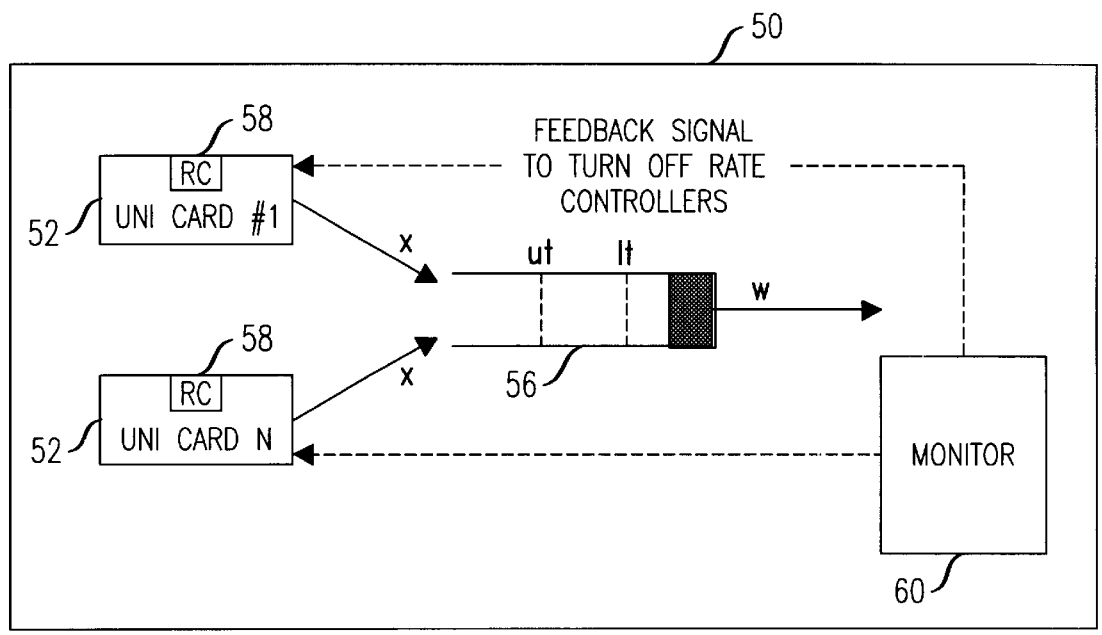
FIGS. 4–5 illustrate usage of the partial back pressure technique in accordance with the present invention as used within an ONT.
Figure 5:
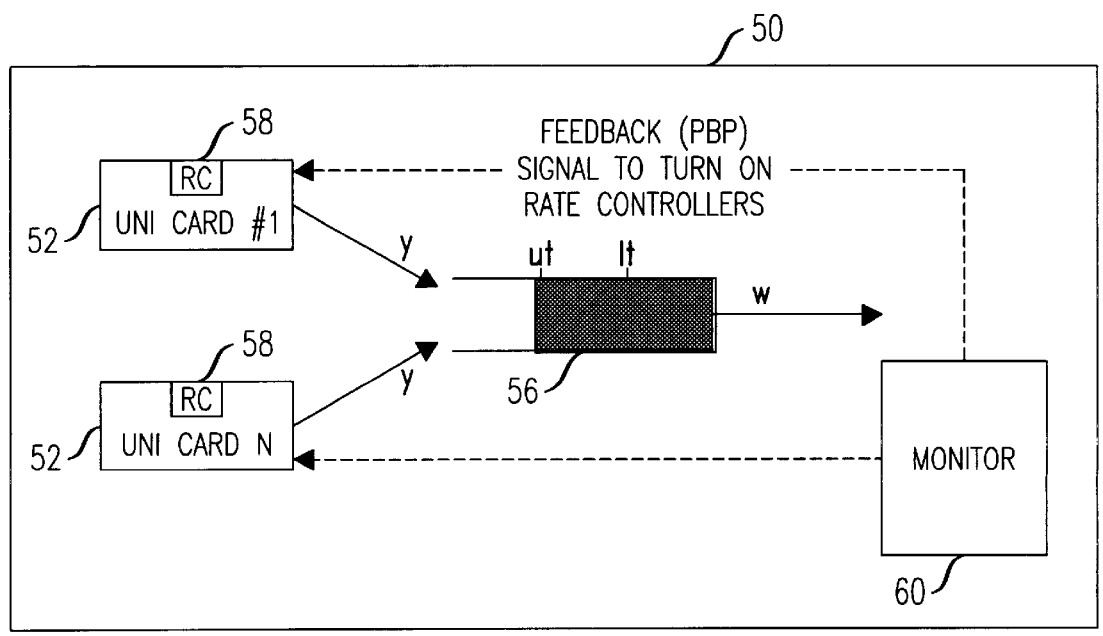

FIGS. 4–5 show an exemplary embodiment of an ONT 50 in accordance with the present invention. As shown, the ONT 50 couples to N user network interface (UNI) cards 52, for example, Ethernet UNI cards. The term Ethernet as used herein refers to those networks and network protocols based upon the IEEE 802.3 standard, including but not limited to 10base-5, 10base-2, 10 base-T. As would be understood, however, the present invention can be utilized in connection with any type of VBR/UBR services and is not limited to Ethernet. The UNI cards 52 generally include one input port and one output port for providing a single stream of data wherein the UNI cards 52 couple the user network and its associated devices to the access network through the ONT 50. The UNI cards 52 provide appropriate translations of the user network data, e.g., Ethernet, to the ONT. Each of the UNI cards 52 in turn couples to a single priority queue 56 in the ONT 50. As would be understood by those skilled in the art, the priority queue 56 can be any type of memory elements, e.g., program controlled RAM or FIFO buffer, that act to sequentially store and output data upon request. In the case of the present invention, the priority queue stores upstream bound Ethernet traffic which is then placed into ATM cell format. As would be understood, the (storage) size of the priority queue will generally be selected based on the output rates of the UNI cards as they relate to the grant rate, as well as other commonly understood criteria. As an example, the priority queue 56 for one exemplary ONT 50 may accommodate up to 4096 cells. One cell is transmitted upstream to the OLT for each data grant that is received at the ONT.

In accordance with the present invention, each of the UNI cards 52 is equipped with a rate controller 58 that limits the peak output rate of the UNI cards 52 when activated. The rate controller 58 in each of the UNI cards 52 is coupled to a queue status monitor 60 in the ONT core. The queue status monitor 60 couples to the priority queue 58 which, as shown, includes an upper threshold level 'ut' and a lower threshold level 'lt'. The queue status monitor 60 provides a feedback channel for priority queue status information between the ONT core and the Ethernet UNI cards 52. As would be understood, the queue status monitoring function may be implemented as a software routine within a digital processor included in the ONT core to periodically check the queue level. Alternately, the status monitor 60 may be implemented primarily in hardware, for example, by sensing a flag status associated with the queue when certain levels are reached.

When a given level is sensed by the queue status monitor 60, a feedback signal is transmitted to the UNI cards 52 in order to activate the rate controllers 58 thereon. The queue status monitor 60 acts to turn on the rate controllers 58 in Ethernet UNI cards 52 to limit their peak rates to a controlled peak rate, 'y'. If the queue level (i.e., the amount of information stored in the queue) becomes smaller than the lower threshold 'lt', the rate controllers 58 are turned off. By having both an upper threshold 'ut' for turning on the rate controllers and a lower threshold 'it' for turning off the rate controllers, a hysteresis effect is achieved in order to limit the amount of switching between the two states. The upper and lower threshold can also be made to be equal, but this is generally undesirable, since transitions between rate control and back will be increased.

The present invention is implemented in the ONT 50 in accordance with the following methodology. Initially, cell transmission is started with the rate controllers 58 in the Ethernet UNI cards 52 (or other LAN protocol interface) turned off. A peak cell rate, denoted by 'x', in FIG. 4 is the maximum rate that UNI cards generate without rate control imposed. The grant rate assigned for Ethernet traffic, is denoted by 'w', and is assumed to be fixed for the purposes of the current discussion. It would also be understood that the present invention can be extended to the time-varying case by considering appropriate variable, e.g. x, y, w, as functions of time.

As long as the amount of information stored in the priority queue 56 does not exceed the upper threshold 'ut', each of the Ethernet UNI cards 52 are allowed to transmit at rates up to their peak rate, 'x'. If, however, the level of the priority queue 56 for the Ethernet traffic becomes larger than the upper threshold 'ut', the rate controllers 58 in the Ethernet UNI cards 52 are turned on to limit their peak rates to the controlled peak rate, 'y'. If the queue size becomes smaller than the lower threshold 'lt', the rate controllers 58 are turned off.

As was mentioned, in order to reduce the amount of switching between the two rates (the activation and deactivation of the rate controllers), a hysteresis mechanism is used, where the upper threshold 'ut' is a given amount greater than the lower threshold 'lt'. In general, the amount of hysteresis relates to packet sizes and traffic patterns. In practice, the assigned grant rate is usually smaller than the sum of peak rates without rate control, i.e. w<Nx, in order to help maximize bandwidth usage—since Ethernet traffic is very bursty. The controlled peak rate 'y' and the upper threshold 'ut' should be determined so that there is no cell loss in the priority queue. If 'y' is set to 0, then this is a classic back pressure scheme. Accordingly, the present invention is distinguishable from classic back pressure methodologies. Such methodologies are also not known to be implemented in connection with passive optical networks.

In order to determine the controlled peak rate and the upper threshold so as to avoid cell loss, it is understood that once all UNIs are under rate control, there should be no cell loss. In an ideal case, where there is no time delay in the transition from exceeding the 'ut' level to the activation of rate control, 'ut' can be set at a minimum, for instance, to "queue size-1 (in cells)". In practical situations, however, there is always a non-zero time delay involved. The delay may take place, for example, with detection of the 'ut' level being exceeded, processing and transmission of back pressure to the UNI, rate controlling, and so on. Assuming that this delay is D seconds, the peak rate of the UNI cards is designated X cells/sec, the assigned upstream BW is W cells/sec (to OLT) and N is the number of UNIs. In a worst case scenario, during the transition period of D seconds, a total of D*X*N (number of UNIs) cells arrive at the queue. During the same period, up to D*W cells can be transmitted to the OLT from the queue. Therefore, the queue should hold at least "D*X*N–D*W" more cells even after passing 'ut' in order to prevent cell loss during this transition period. It would apparent to persons skilled in that the above presents a simple estimate and that in actual implementation, other factors including slotted-time (discreted time) may also be considered.

It can be seen that the partial back pressure (PBP) scheme has significant advantages compared to the two-queue approach of the prior art. For instance, under normal operating conditions where the combined rate of incoming flows is not exceedingly high, the incoming traffic flows from Ethernet UNI cards do not have to be limited. By doing so, high transmission efficiency can be achieved through statistical multiplexing. The only time the incoming rate of traffic flow from Ethernet UNI cards has to be limited to a certain level is when there are long-lasting and excessive traffic flows from Ethernet UNI cards, which would result in large cell loss and unfairness. Limiting the peak rate at Ethernet UNI cards all the time solves the unfairness problem but cannot achieve efficient transmission. To reap the benefit of statistical multiplexing while reducing the unfairness effect, the present invention dynamically controls the peak rate of Ethernet UNI cards based on feedback information from the ONT core. In addition, the link speed for feedback information between the ONT core and the Ethernet UNI cards may not be exceptionally fast, so there may be a limitation in the amount of feedback information and the frequency of transferring it from the ONT core to Ethernet UNI cards. Accordingly, a hysteresis mechanism is employed in order to limit the number of transitions between the controlled peak rate and the uncontrolled peak rate.

The present invention achieves efficient transmission while reducing possible unfairness between Ethernet UNIs. It does not resort to any non-standard methods like tagged grants so it is easy to implement and there is no problem in interworking OLTs from other vendors. It also has good scalability which is different from the two-queue approach, in that there is no limitation in the number of UNI cards supported.

The foregoing is merely illustrative of the principles of the invention. Those skilled in the art will be able to devise numerous arrangements, which, although not explicitly shown or described herein, nevertheless embody those principles that are within the spirit and scope of the invention. For example, although the present invention is described as fairly allocating communications traffic received from Ethernet UNI cards, for example, it would be understood that the PBP technique of the present invention for use with ATM PONs could also be utilized with other types of network interface cards. These can be network interface cards for other types of LAN traffic, for example, token ring, frame relay or ATM interface cards for a VBR source, e.g. AAL2 (ATM Adaptation Layer 2), AAL5 and voice/video. Moreover, the present invention may used to increase efficiency in connection with any interface cards for VBR, ABR or UBR sources or any type of service other than CBR. It would also be understood that an ONT described with respect to the present invention may support more than two UNI interface cards, where the output of each card couples to the priority queue. In addition, although the UNI cards are shown as having a single output stream, it would be understood that the present invention can support UNI cards having more than one output stream. In such a case, each stream would be treated as a single logical card having its output coupled to the priority queue. The present invention is also not necessarily limited to optical networks and may be used in other types of passive networks. Many other modifications and applications of the principles of the invention will be apparent to those skilled in the art and are contemplated by the teachings herein. Accordingly, the scope of the invention is limited only by the claims appended hereto.

What is claimed is:

1. An apparatus for regulating upstream transmission of cells from a customer-side network interface device to a network-side interface device in a passive network, said customer side network interface device adapted to couple with one or more customer network interface cards having rate controllers thereon to reduce a maximum output rate of said interface cards from a peak rate to a controlled peak rate, said apparatus comprising:
   a priority queue coupled to corresponding network interface cards of said customer-side network interface device for storing therein cells awaiting upstream transmission to said network-side interface device; and
   a queue status monitor coupled to said priority queue, said status monitor operable to sense when a first threshold in said queue is exceeded, wherein a feedback signal is generated in response to said first threshold being exceeded such that said rate controllers of said network interface cards are activated to limit the maximum output rate thereof to said controlled peak rate, said rate controllers being deactivated when a level in said queue falls below a second threshold such that the maximum output rate of said cards is restored to said peak rate,
   wherein said first threshold is selected in order to avoid cell loss during transitions between rate control activation and back, wherein the queue holds at least (D*X*N−D*W) additional cells beyond said first threshold, where D represents the transition delay, X represents the peak rate, N represents the number of user network interfaces and W represents the assigned upstream bandwidth.

2. The apparatus of claim 1, wherein said passive network is a passive optical network (PON).

3. The apparatus of claim 1, wherein said passive optical network is an ATM-PON.

4. The apparatus of claim 1, wherein said network interface cards accept communications traffic from a non-constant bit rate source.

5. The apparatus of claim 1, wherein said first threshold and said second threshold are the same.

6. The apparatus of claim 1, wherein said first threshold and said second threshold are different such that a hysteresis is provided in said queue to limit transitions between rate control.

7. The apparatus of claim 1, wherein said customer-side interface is an optical network termination (ONT), said cells being output from said queue in response to grants generated from said network-side interface.

8. The apparatus of claim 1, wherein said upper threshold is selected in order to avoid cell loss during transitions between rate control activation and back.

9. The apparatus of claim 1, wherein said network interface cards receive communications traffic selected from the group consisting of Ethernet, token ring, frame relay, AAL2, AAL5, and voice/video.

10. An optical network termination (ONT) apparatus for use in a passive optical network, said ONT adapted to couple with one or more network interface cards having rate controllers thereon to reduce a maximum possible output rate of said interface cards from a first rate to a second rate, said apparatus comprising:
    a priority queue coupled to corresponding network interface cards of said ONT for storing cells therein awaiting upstream transmission to said OLT in accordance with grants issued from an optical line termination (OLT) device; and
    a queue status monitor coupled to said priority queue, said status monitor operable to sense when a first threshold is exceeded in said queue, wherein a feedback signal is generated in response to said first threshold being exceeded such that said rate controllers of said network interface cards are activated to alter the output rate of said network interface cards from said first rate to said second rate, said rate controllers being deactivated when a level in said queue falls below a second threshold such that said maximum possible output rate of said interface cards returns to said first rate,
    wherein said first threshold is selected in order to avoid cell loss during transitions between rate control activation and back, wherein the queue holds at least (D*X*N−D*W) additional cells beyond said first threshold, where D represents the transition delay, X represents the peak rate, N represents the number of user network interfaces and W represents the assigned upstream bandwidth.

11. The apparatus of claim 10, wherein said network interface cards accept communications traffic from a non-constant bit rate source.

12. The apparatus of claim 10, wherein said passive optical network (PON) is an ATM-PON.

13. The apparatus of claim 10, wherein said first threshold and said second threshold are different such that a hysteresis is provided in said queue to limit transitions between rate control.

14. The apparatus of claim 10, wherein said customer-side interface is an optical network termination (ONT), said cells being output from said queue in response to grants generated from said network-side interface.

15. An optical network termination (ONT) apparatus for use in an ATM passive optical network, said apparatus comprising:
- at least one network interface card having rate controllers thereon to reduce a maximum output rate of said interface card from a first rate to a second rate;
- a priority queue coupled to corresponding network interface cards of said ONT for storing cells therein awaiting upstream transmission to a network-side optical interface device; and
- a queue status monitor coupled to said priority queue, said status monitor operable to sense when a first threshold is exceeded in said queue, wherein a feedback signal is generated in response to said first threshold being exceeded such that said rate controllers of said network interface cards are activated to alter the output rate of said network interface cards from said first rate to said second rate, said rate controllers being deactivated when a level in said queue level falls below a second threshold,
- wherein said first threshold is selected in order to avoid cell loss during transitions between rate control activation and back, wherein the queue holds at least (D*X*N−D*W) additional cells beyond said first threshold, where D represents the transition delay, X represents the peak rate, N represents the number of user network interfaces and W represents the assigned upstream bandwidth.

16. The apparatus of claim 15, wherein said network interface cards accept communications traffic from a non-constant bit rate source.

17. A method of regulating upstream transmission of cells from a customer-side optical network interface device to a network-side optical interface device in a passive optical network, where said customer-side optical network interface couples with one or more customer network interface cards having rate controllers thereon to reduce a maximum output rate of said interface cards from a peak rate to a controlled peak rate, said method comprising the steps of:
- monitoring a priority queue in said customer-side optical network interface having cells stored therein awaiting upstream transmission to said network-side optical interface device;
- activating said rate controllers when a first threshold is exceeded in said queue to limit the output of said network interface cards to said controlled peak rate, and
- deactivating said rate controllers when said queue falls below a second threshold such that the maximum output rate of said cards is restored to said peak rate,
- wherein said first threshold is selected in order to avoid cell loss during transitions between rate control activation and back, wherein the queue holds at least (D*X*N−D*W) additional cells beyond said first threshold, where D represents the transition delay, X represents the peak rate, N represents the number of user network interfaces and W represents the assigned upstream bandwidth.

18. The method of claim 17, wherein said network interface cards accept communications traffic from a non-constant bit rate source.

19. The method of claim 17, wherein said customer-side interface is an optical network termination (ONT), said cells being output from said queue in response to grants generated from said network-side interface.

20. The method of claim 17, wherein said network interface cards receive communications traffic selected from the group consisting of Ethernet, token ring, frame relay, AAL2, AAL5, and voice/video.

* * * * *